Patented Oct. 14, 1941

2,258,947

UNITED STATES PATENT OFFICE 2,258,947

PRODUCTION OF ITACONIC AND CITRACONIC ANHYDRIDES

Joyce H. Crowell, Orchard Park, N. Y., assignor to National Aniline and Chemical Company, Inc., New York, N. Y., a corporation of New York No Drawing. Application September 21, 1939, Serial No. 295,917

5 Claims. (Cl. 260—341)

This invention concerns an improvement in the production of itaconic and citraconic anhydrides from citric acid.

When citric acid is subjected to distillation by heating it to temperatures sufficiently above its melting point, it undergoes decomposition into itaconic and citraconic anhydrides. These anhydrides may be recovered as such or as the corresponding free acids. However, other decomposition reactions also occur leading to carbonaceous residues and other products of little value.

The yields of itaconic and/or citraconic anhydride according to several processes disclosed in the literature are low, for example around 50% or less. Thus, according to "Organic Syntheses," vol. 11, pages 70–71 (1931), when 200 grams of citric acid are melted and then heated in a distillation flask very rapidly so as to complete the distillation in 10 to 12 minutes, the distillate consists of water and itaconic anhydride, the latter in 37% to 47% yield, the reaction proceeding according to the following equation:

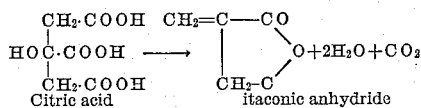

It has been proposed to convert citric acid into a mixture of itaconic and citraconic anhydrides and acids by slowly and continuously introducing a concentrated aqueous solution of citric acid into a vessel which is heated to 230° C. or higher and is maintained under a relatively high vacuum, and to continuously remove the vaporous products of reaction. By this means yields of itaconic and citraconic acids as high as 95% are said to be obtained. The high yields are said to be due to two factors: (1) citric acid and the desired decomposition products thereof are subjected to decomposition temperatures for only a very short time; (2) intermolecular reactions resulting in the formation of reaction products other than citraconic and itaconic acids (or anhydrides) are prevented by the dilution of the citric acid by means of water. However, this procedure has several disadvantages. These disadvantages are as follows:

First, the water introduced with the citric acid must be vaporized before the citric acid can be completely vaporized. This requires additional heat input. As the heat requirement is an important item in the cost of producing citraconic and itaconic anhydrides, the importance of reducing the amount of water to be vaporized is considerable.

Secondly, the presence of water in the citric acid reduces the capacity of the vaporizing vessel. It is essential in the distillation of citric acid to obtain a very rapid transfer of heat from the heating medium (e. g. a jacket of boiling liquid) to the citric acid. Nevertheless, this object cannot be attained solely by increasing the temperature of the heating medium because destruction of the citric acid into products other than citraconic and itaconic anhydrides sets in at higher temperatures. To obtain high yields, it is necessary to operate at temperatures substantially below those at which citric acid is completely destroyed in the above sense and to effect rapid transfer of heat by maintaining only a thin film of molten citric acid on the bottom and/or walls of the heating vessel. If, however, this film of citric acid is diluted with water, the capacity of a given vessel, i. e. one adapted to maintain a given area of film, is correspondingly reduced.

Thirdly, the mixture of water and citric acid treated in such a process is corrosive to metallic equipment, particularly the hot vaporizing surfaces.

Fourthly, the introduction of water with the citric acid increases the difficulties of recovery of the reaction products. If total condensation of the products is desired, the size of cooling equipment and/or the amount of cooling medium must be increased. Furthermore, the presence of large quantities of water in the condensate increases the difficulty of preparing the citraconic and itaconic acids and anhydrides in crystalline form therefrom. If fractional condensation of citraconic and itaconic anhydrides from the gaseous or vaporous reaction products is desired, the difficulties of good fractionation are increased by the presence in the vapors being condensed of water over and above that formed by the thermal decomposition of the citric acid.

I have discovered the suprising fact that citric acid may be rapidly and very completely converted into citraconic and itaconic anhydrides without employing water as a diluent. In accordance with my invention anhydrous citric acid is gradually introduced into contact with a heating medium maintained at a temperature between 190° C. and 270° C. and an absolute pressure between 10 mm. and 350 mm. of mercury. Under these conditions the conversion proceeds at a rapid rate, the citric acid probably being heated for not more than 120 seconds to convert it substantially completely to the itaconic-citraconic anhydride vapor mixture.

The heating medium may be a solid or liquid metallic or non-metallic surface.

By means of this procedure high yields of citraconic and itaconic acids and/or their anhydrides are obtained with the formation of only small amounts of carbonaceous residue, generally amounting to about 3% to 4% by weight of the citric acid introduced, part of which may be due to non-volatile impurities in the citric acid. At the same time the serious disadvantages of using diluent for the citric acid are avoided.

The vaporization medium may be a simple externally heated still or an externally heated rotary drum containing loose scraping elements such as described in my United States patent application Serial No. 245,370 of December 13, 1938. It may be constructed of any material which is not seriously attacked by citric acid, or by itaconic or citraconic acids, or by their anhydrides, for example, glass, stone, copper, and inert alloys of copper such as "Everdur" (an alloy containing 94–96% copper, 3–4.5% silicon, and 1–1.1% manganese). It is noted in this connection that with aqueous mixtures of citric acid a definite corrosion problem exists even with corrosion-resistant equipment. This problem is substantially reduced, however, by employing the citric acid in anhydrous form.

The vessel may be heated by any suitable means such as a boiling or non-boiling bath or hot combustion gases.

The products of reaction may be recovered by conventional means such as condensation (fractional or complete), scrubbing, etc.

In its preferred form this invention is practiced as follows:

Finely divided, substantially pure, anhydrous, crystalline citric acid is introduced as a substantially continuous stream by suitable means such as a screw conveyor into a conversion vessel which is externally heated by a heating medium at a suitable temperature (e. g. between 250° and 350° C.) and the rate of citric acid introduction is regulated so that the vapor temperature in the vessel is between 240° and 260° C. The vapors from the converter are led to condensers wherein condensable products are recovered. Uncondensed gases are exhausted by a vacuum pump operated to maintain a substantially constant absolute pressure between 10 mm. and 100 mm. of mercury in the converter.

It is preferred to use finely divided citric acid because the particles thereof vaporize more quickly than larger particles.

The following specific examples will serve to illustrate how my invention may be carried out. These examples, while representing preferred practice, are intended only to be illustrative and it is to be understood that there are many possible variations of procedure.

*Example 1.*—2304 grams (12 mols) of pure, anhydrous, granular, crystalline citric acid, comminuted to pass through a 10-mesh screen, were allowed to drop at a uniform rate during about 6¼ hours onto the bottom of a stationary, cylindrical, jacketed "Everdur" vessel (height 8 inches, diameter 8 inches, inside dimensions) under a pressure of about 30 mm. to 60 mm. of mercury and heated by naphthalene boiling in the jacket under a pressure of 20 pounds per square inch, corresponding to a temperature of about 260° C., the rate of addition of citric acid being such that the pressure did not rise above about 85 mm. of mercury. The resulting vapors at a temperature between 240° and 250° C. were withdrawn to a cooling apparatus wherein they were cooled to condense vaporous reaction products.

1512 grams of crude distillate containing a mixture of water and itaconic and citraconic acids and/or their anhydrides were obtained which, upon agitation and standing, resolved into a light brown, oily, crystalline mush. The crude distillate, after dilution with water, contained 1462 grams (11.25 mols) of dibasic acid, which corresponds to 93.72% of the theoretical yield of dibasic acid. Of this about 40% was itaconic acid and about 60% citraconic acid. In addition 17 grams (.13 mol) of a mixture of citraconic and itaconic acids were recovered by rinsing the cooling apparatus with water. A total of 1479 grams (11.38 mols) of dibasic acid, which corresponds to 94.81% of theory, was thus obtained. A mixture of itaconic and citraconic anhydrides was obtained in good yield by fractionally distilling the crude distillate under vacuum.

*Example 2.*—1395 grams (7.27 mols) of pure, anhydrous, granular citric acid in finely divided form (10-mesh) were introduced at a uniform rate over a period of 4⅓ hours into the same apparatus and under the same conditions as employed in Example 1 above. 913 grams of distillate were obtained which, after dilution with water, contained 876 grams (6.74 mols) of dibasic acid=92.75% of the theoretical yield of dibasic acid. Citraconic acid and itaconic acid were present in the proportion of about 60:40. In addition 8 grams (0.06 mol) of a mixture of citraconic and itaconic acids were recovered from the cooling apparatus, thus making a total yield of 884 grams (6.80 mols) of dibasic acid=93.6% of theory.

In a set of tests conducted to determine the effect of temperature upon the conversion, the following results were obtained in apparatus similar to that of the preceding examples.

*Example 3.*—By introducing finely divided anhydrous crystalline citric acid into a vessel jacketed by a heating medium maintained at 230° C., a feed rate of 72 grams per hour being maintained so as to provide a vapor temperature at the exit from the vessel between 197° and 214° C., there was obtained a mixture of citraconic and itaconic acids corresponding to 82.5% of the theoretical yield.

*Example 4.*—By introducing finely divided anhydrous crystalline citric acid into a vessel jacketed by a heating medium maintained at 248° C., a feed rate of 75 grams per hour being maintained so as to provide a vapor temperature at the exit from the vessel between 221° C. and 231° C., there was obtained a mixture of citraconic and itaconic acids corresponding to 87.3% of the theoretical yield.

*Example 5.*—By introducing finely divided anhydrous crystalline citric acid into a vessel jacketed by a heating medium maintained at 260° C., a feed rate of 74 grams per hour being maintained so as to provide a vapor temperature at the exit from the vessel between 242° and 246° C., there was obtained a mixture of citraconic and itaconic acids corresponding to 91.7% of the theoretical yield.

In each of the preceding examples, the absolute pressure within the vessel was maintained at about 30 mm. to 60 mm.

In the following claims the term "anhydrous citric acid" is meant to include both molten and solid citric acid containing substantially no water of crystallization. Moreover, where I refer to the production of itaconic and citraconic anhydrides, it will be understood that I refer to the immediate products of the conversion and that recovery of the products in the form of acids and recovery in the form of the anhydrides are equally within the purview of the invention.

I claim:

1. The method of making itaconic and citraconic anhydrides, which comprises thinly distributing anhydrous citric acid in contact with a heating medium maintained at an absolute pressure between 10 mm. and 350 mm. of mercury, and maintained at a temperature sufficient to produce from said anhydrous citric acid vapors at a temperature between 190° and 270° C.

2. The method of making itaconic and citraconic anhydrides, which comprises introducing finely divided solid anhydrous citric acid into contact with a heating medium maintained at an absolute pressure between 10 mm. and 350 mm. of mercury and maintained at a temperature sufficient to produce from said anhydrous citric acid vapors at a temperature between 190° and 270° C.

3. The method of making itaconic and citraconic anhydrides, which comprises introducing finely divided solid anhydrous citric acid in the form of a substantially continuous stream into contact with a heating medium maintained at an absolute pressure between 10 mm. and 100 mm. of mercury, and maintained at a temperature sufficient to produce from said anhydrous citric acid vapors at a temperature between 190° and 270° C.

4. The method of making a vaporous mixture of citraconic and itaconic anhydrides, which comprises causing finely divided solid anhydrous citric acid to flow in the form of a substantially continuous stream into a heated metallic vessel maintained at an absolute pressure between 10 mm. and 100 mm. of mercury and controlling the rate of heating and flow of acid so that the vapors produced have a temperature between 240° and 260° C.

5. The method of making a mixture of citraconic and itaconic anhydrides, which comprises causing finely divided solid anhydrous citric acid to flow in the form of a substantially continuous stream into a heated metallic vessel maintained at an absolute pressure between 10 mm. and 100 mm. of mercury and controlling the rate of heating and introduction of acid so that the vapors produced have a temperature between 240° C. and 260° C., and withdrawing vapors at said temperature from said vessel and cooling them to condense a product containing itaconic and citraconic anhydrides.

JOYCE H. CROWELL.